C. HOWELL.
Mowing Machine
2 Sheets—Sheet 1.
No. 19,367.
Patented Feb. 16, 1858.
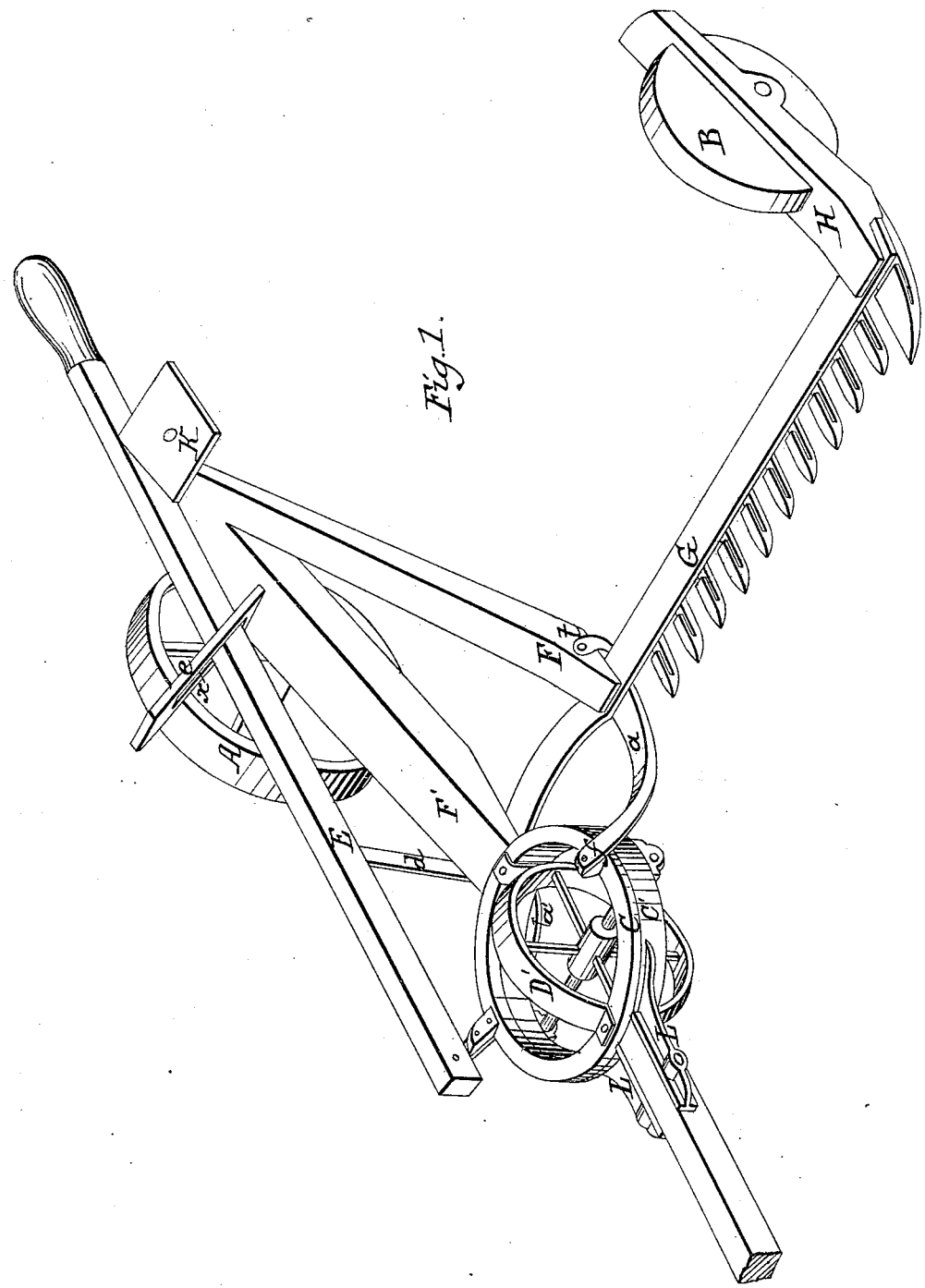

C. HOWELL.
Mowing Machine.
No. 19,367.
2 Sheets—Sheet 2.
Patented Feb. 16, 1858.
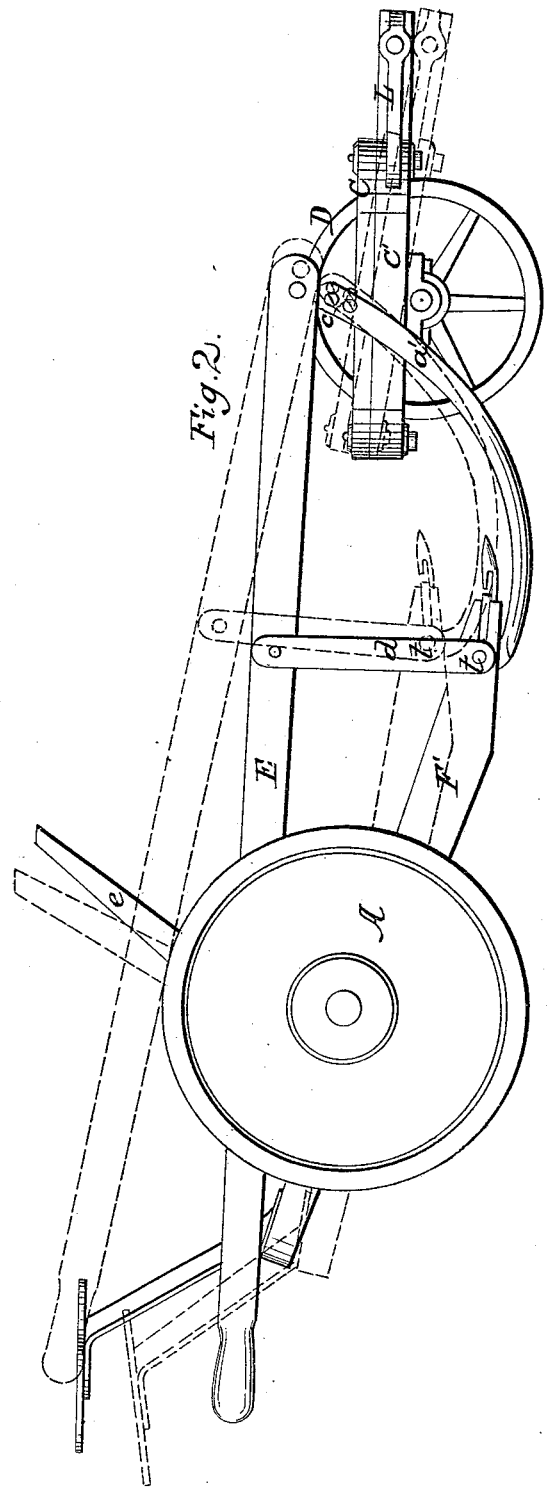

UNITED STATES PATENT OFFICE.

CHAS. HOWELL, OF CLEVELAND, OHIO.

IMPROVEMENT IN REAPING AND MOWING MACHINES.

Specification forming part of Letters Patent No. 19,367, dated February 16, 1858.

*To all whom it may concern:*

Be it known that I, CHARLES HOWELL, of Cleveland, in the county of Cuyahoga and State of Ohio, have invented a certain new and useful Improvement in Reapers and Mowers, of which the following is a full, clear, and exact description, reference being had to the accompanying drawings, making part of this specification, in which—

Figure 1 represents a view in perspective of a machine having my improvement applied to it, and Fig. 2 represents a side elevation of the same.

My improvement relates to the construction of reaping and mowing machine in which a single caster-wheel is used in front for the support and guidance of the machine and for relieving the horse's neck of its weight; and it consists in a new mode of connecting the truck-frame of the caster-wheel to the main frame of the machine, which has a lever applied to it, by means of which the cutting apparatus may be instantly raised by the driver or raker to surmount obstructions which suddenly present themselves in the front of the machine, without being under the necessity of stopping to adjust it for this purpose or of passing around it, which heretofore has been a great drawback to the use of this kind of truck.

To enable others skilled in the art to make, construct, and use my improvement, I will now proceed to describe it in detail.

The machine is represented in the drawings as consisting of two frames, to the rear one of which is secured the cutting apparatus, and is called the "main frame," while the forward one is called the "truck-frame," and which in this instance is supported by a single wheel on the principle of the common caster-wheel, in the use of which in this connection there are many advantages over the two-wheeled truck which do not require to be enumerated here. Heretofore, when applied to harvesting-machines, they have been so attached to the main frame as to form rigid or inflexible connections, though capable of being adjusted to cut the grain or grass at different heights from the ground, but altogether incapable of being raised to surmount obstructions which suddenly present themselves while the machine is operating.

The main frame consists of two rails, F and F′, firmly secured together at their rear extremity, but diverging from each other as they project forward in such manner as to describe an acute angle, they being connected together at their front end by means of the inner end of the finger-bar G, to which they are secured in any suitable manner, the outer end of the finger-bar G being secured to the forward end of the frame H of the supporting-wheel B. Thus constructed, the frame is then mounted on the axles, respectively, of the driving-wheel A and supporting-wheel B, and connected to the truck-frame of the caster-wheel D by means of draft-bars *a* and *a*′, the hinder extremities of which are connected to the rails F and F′, immediately in rear of the cutter-bar, by horizontal bolts *b*, passing through the rails, and an eye formed on the end of the draft-bars in the manner of a hinge-joint, these bars being curved, with their concave side turned upward, so as to give to the frame a degree of flexibility which it could not obtain were they made straight. The forward ends of the draft-bars *a* and *a*′ are connected to the stationary ring C or portion of the truck-frame by means of screw-bolts *f*, and may either be rigidly secured to it or merely hinged or pivoted, as may be deemed best, both ways possessing their respective advantages.

The truck-frame consists of two principal parts—to wit, a stationary or fixed ring, C, and a revolving ring, C′. In the latter are formed bearings for the caster-wheel D, and in front the hound L for the attachment of the tongue of the machine. In the stationary ring C are formed legs or standards *c*, to which the draft-bars are secured, as before described. The inner faces of these rings are formed with corresponding projections and depressions, so as to fit into each other and work smoothly, and are clamped together by clasps *o* in such manner as to prevent them from becoming separated from each other, which they would otherwise do were some such arrangement not used.

To the leg or standard *c*, formed on the outer side of the stationary ring C, or to that end of the draft-bar *a*′ secured to it, is attached one end of a lever by means of a bolt, and which forms its fulcrum. This lever E extends back over the main frame until within convenient reach of the raker's or driver's seat. To this lever the front part of the main frame is connected by means of an arm, *d*, at a point considerably nearer its front than its rear extremity, for the purpose of giving the necessary leverage to the operator, so that he can with little exertion either raise or lower the cutting apparatus, as circumstances may direct, by simply raising or depressing the rear end of the lever. The arm $d$, which connects the main frame and lever, is mounted to the same bolt, $b$, by means of which the outer draft-bar, $a'$, is hinged to the rail $F'$.

The rear end of the lever is passed through the slot $x$ of an inclined standard, $e$, mounted on the rail $F'$. The slot is made of a length sufficient to enable the operator to raise or lower the finger-bar to the maximum degree of height required and to retain it in that position by passing a pin through a hole, and of which there are a series, in the standard $e$, immediately under the lever, which, while it prevents the finger-bar from drooping too low, yet permits the cutter-bar to accommodate itself to the inequalities of the ground and to be raised instantaneously, so as to override such obstructions as may happen in the way of the machine.

Having thus described my improvement in harvesting-machines provided with caster-trucks, what I claim as new, and desire to secure by Letters Patent, is—

The method of connecting the caster-truck with the main frame, when used in connection with a lever, E, and arm $d$, as described, whereby the operator is enabled instantly to raise the cutting apparatus to surmount such obstacles as may suddenly present themselves, and to regulate the height of the cut, and at the same time allow the machine to accommodate itself to the inequalities of the ground.

In testimony whereof I hereunto set my hand.

CHAS. HOWELL.

Witnesses:
P. HANNAY,
W. LESLIE.